Nov. 5, 1940. N. Z. GRASSO 2,220,518
EMERGENCY WHEEL
Filed Oct. 25, 1938 3 Sheets-Sheet 1

Inventor
Nicholas Z. Grasso
By Lacey & Lacey
Attorneys

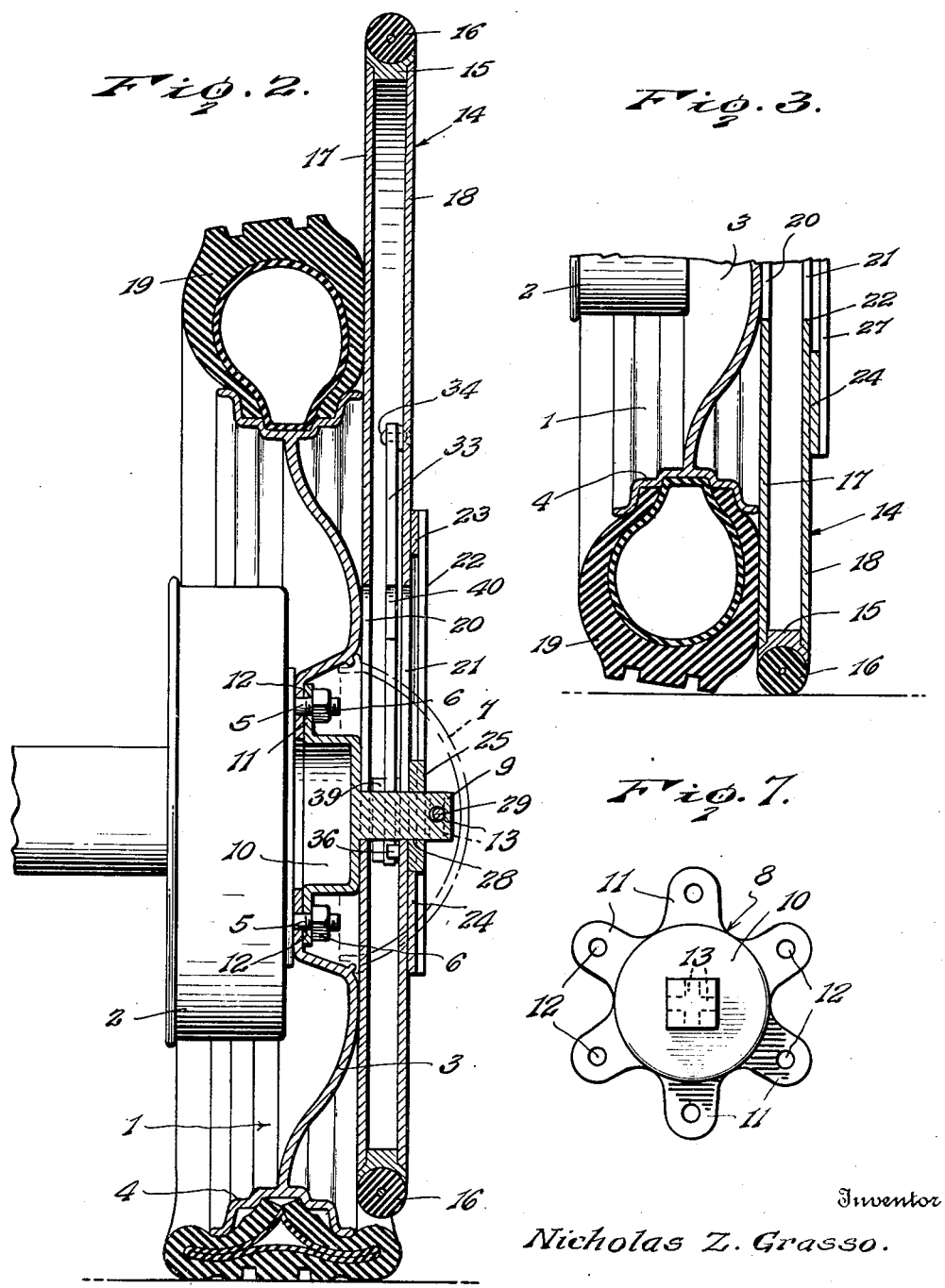

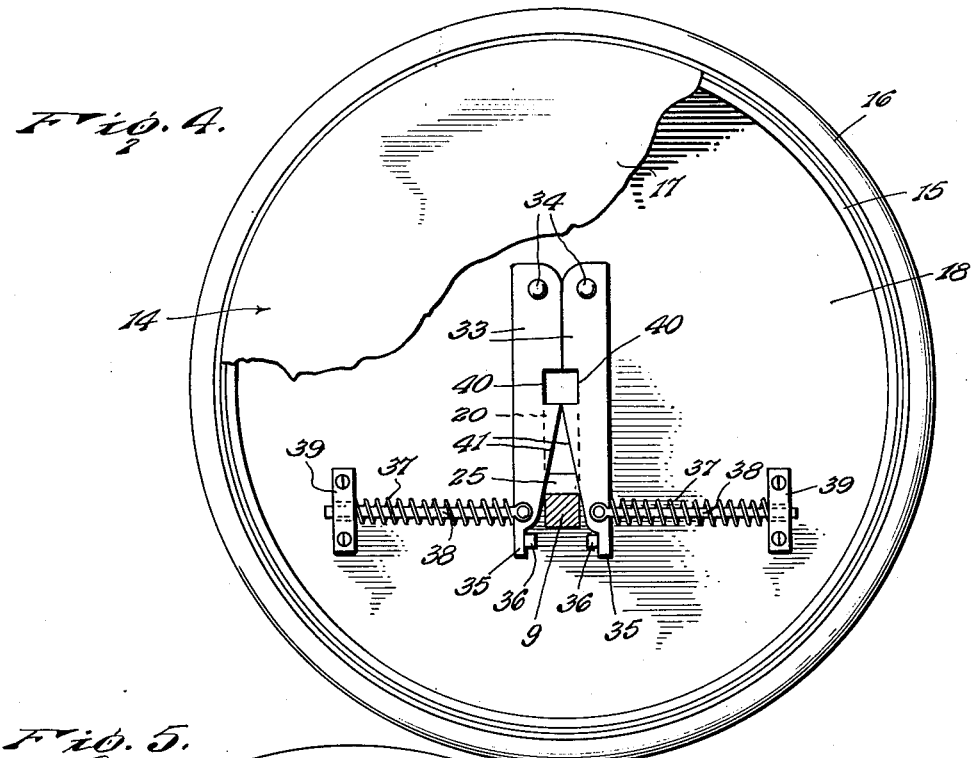
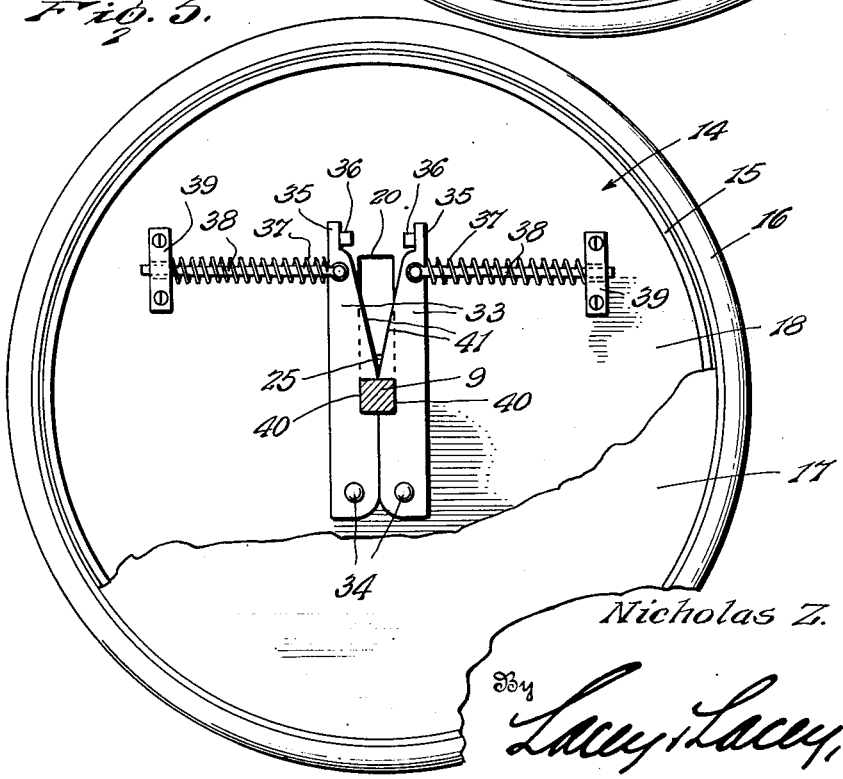

Patented Nov. 5, 1940

2,220,518

UNITED STATES PATENT OFFICE 2,220,518

EMERGENCY WHEEL

Nicholas Z. Grasso, Hollis, N. Y.

Application October 25, 1938, Serial No. 236,956

7 Claims. (Cl. 301—38)

This invention relates to an emergency wheel for use upon automobiles and other motor vehicles, and it is one object of the invention to provide a device of this character which may be applied to a wheel when a tire is punctured and serve to hold the wheel to which it is applied in such a position that all weight will be removed from the punctured tire. It will thus be seen that, if a tire is punctured while traveling along a road, it is not necessary to change the tire or the wheel as the emergency wheel can be easily and quickly applied and the journey continued until a service station is reached.

Another object of the invention is to provide a mounting member for the emergency wheel which may be secured by the bolts holding the disk of the wheel to the brake drum and enclosed by the usual hub cap. It will thus be seen that the mounting member will at all times be in position for use without detracting from the usual appearance of the wheel and that, when application of the emergency wheel is required, it is merely necessary to remove the hub cap and the emergency wheel may be applied to its mounting which projects outwardly from the wheel after removal of the hub cap.

Another object of the invention is to provide an emergency wheel so constructed that it may be very easily thrust into place upon the stub shaft or shank of the mounting and then moved into position concentric to the wheel as the wheel is turned. It will thus be seen that it is not necessary to employ a jack to lift the axle before applying the emergency wheel as the emergency wheel is initially applied in eccentric relation to the wheel carrying the punctured tire and then assumes a position concentric to the wheel when the wheel is turned.

Another object of the invention is to provide the emergency wheel with an improved arrangement of dogs for engaging the shank or stub shaft of the mounting member and securing the emergency wheel concentric to the wheel to which it is applied.

It is another object of the invention to provide improved means for holding the emergency wheel upon the stub shaft or shank of its mounting member and preventing the auxiliary wheel from having side play longitudinally of the stub shaft when it is mounted thereon and in use.

Another object of the invention is to provide an emergency wheel which is of a simple construction and very strong, but light in weight and relatively thin, so that it will be easy to handle when applying or removing it and occupy a small space when stored in the luggage compartment of an automobile.

Figure 1:
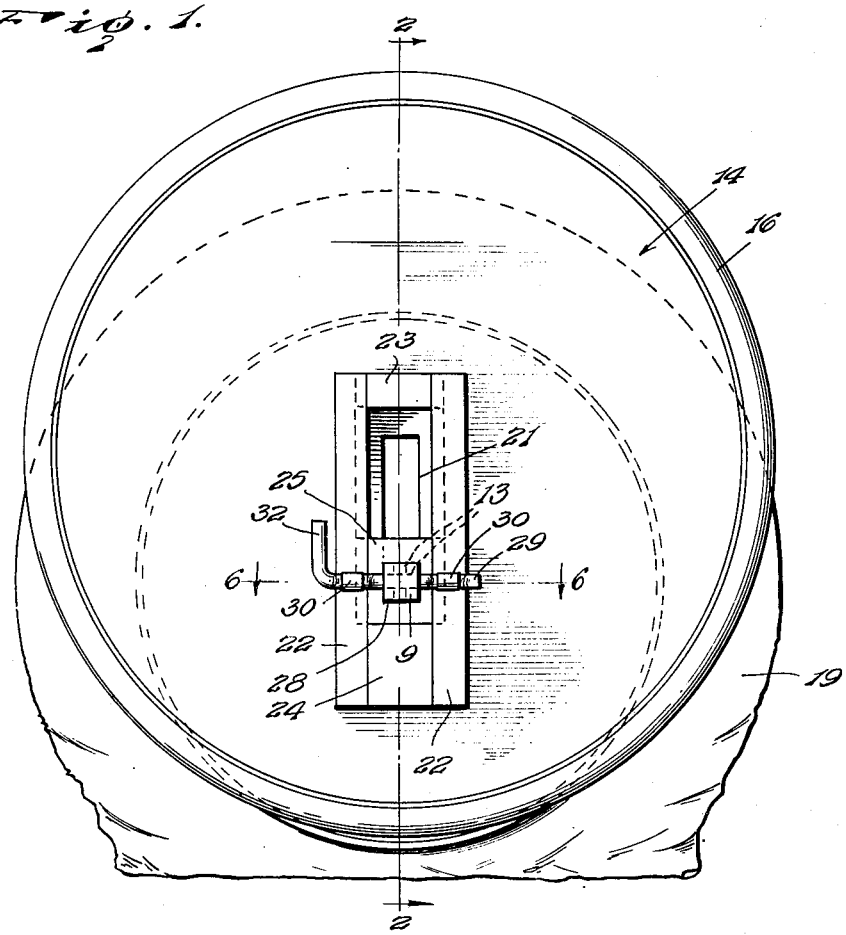
Figure 6:
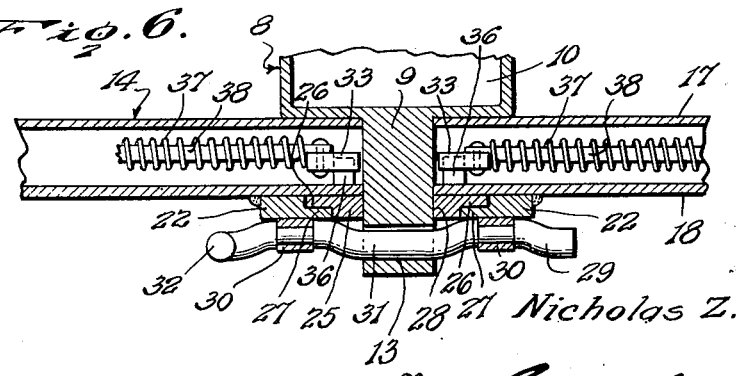

The invention is illustrated in the accompanying drawings, wherein:

Figure 1 is a view in side elevation showing the emergency wheel initially applied to a wheel, the tire of which has been punctured and gone flat, Figure 2 is a transverse sectional view taken vertically through Figure 1 along the line 2—2, Figure 3 is a fragmentary view in section illustrating the manner in which the emergency wheel supports the wheel with the punctured tire when it is disposed in a position concentric to the main wheel, Figure 4 is a view partially in elevation and partially in section and showing the position of the emergency wheel relative to its mounting when initially applied, Figure 5 is a view similar to Figure 4 showing the emergency wheel secured in position for use concentric to the wheel having the punctured tire, Figure 6 is a sectional view taken along the line 6—6 of Figure 1, and Figure 7 is a view of the mounting looking at the outer end thereof.

The automobile wheel 1 to which the emergency wheel has been shown applied is of a conventional construction and has the usual brake drum 2 to which the disk 3 carrying the rim 4 is secured by the bolts or studs 5 and their nuts 6. The hub cap 7, which is indicated by dotted line in Figure 2, is detachably mounted in the usual manner and is removed when the emergency wheel is applied.

The mounting 8 for the emergency wheel has a solid shank or stub shaft 9 which projects outwardly from a cup-shaped base 10, from which extend radiating arms 11 formed with openings 12 through which the bolts 5 may be passed and the nuts 6 then applied to firmly secure the mounting or spider with the stub shaft or shank 9 in alinement with the axle carrying the main wheel 1. Openings 13 are formed transversely through the stub shaft adjacent its outer end in intersecting relation to each other, as shown in Figure 7.

The emergency wheel 14 has a rim 15 carrying a solid tire 16 and against opposite side faces of the rim 15 are secured the inner and outer disks 17 and 18. The emergency wheel is of a diameter slightly greater than the diameter of the tire 19 carried by the main wheel 1 so that, when the emergency wheel is applied to the shank of its mounting and secured in a position concentric to the main wheel and the tire carried thereby, the tire 19 will be held out of contact with the ground, as shown in Figure 3. Therefore no weight will be upon the punctured tire and damage caused by running upon a flat tire will be prevented. Application of the emergency wheel will also eliminate the necessity of changing a tire or a wheel when the tire is punctured. Slots 20 and 21 are formed in the inner and outer disks in alinement with each other and each extends radially of the disk in which it is formed from the center of the disk, and these slots are of such length that, when the emergency wheel is initially applied by passing the shank or stub shaft through the outer end portions of the slots, the emergency wheel will be disposed in eccentric relation to the main wheel with its lower portion spaced upwardly from the ground and above the collapsed lower portion of the flat tire, as shown in Figures 1 and 2. Strips or tracks 22 which are formed of strong metal are welded or otherwise secured against the outer face of the outer disk 18 along opposite side edges of the slot 21 and between upper and lower end portions of the track-forming strips extend cross strips 23 and 24 constituting means for limiting sliding movement of a plate 25. This plate has its side edge portion reduced in thickness to form marginal flanges or tongues 26 which engage under the marginal flanges or tongues 27 of the track 22. Therefore, the plate 25 will be permitted to slide freely between the tracks longitudinally of the slot 21 but its sliding movement will be guided and the extent to which it may slide limited by the cross strips 23 and 24. While the track 22 and the cross strips 23 and 24 have been shown formed of separate strips of metal, it is to be understood that they could be formed as a single rectangular frame, and this frame welded or otherwise firmly secured against the outer face of the side plate 18 about the slot 21. Use of the frame or tracks imparts greater strength than would be the case if the plate or block 25 were merely slidably mounted in the slot 21. A rectangular opening 28 is formed through the plate 25 centrally thereof to snugly receive the shank or stub shaft 9, and from an inspection of Figure 6, it will be seen that, when the emergency wheel is applied to the shank 9, the openings 13 will be disposed externally of the plate 25 in order that a securing pin or key 29 may be passed through a selected one of the openings 13. This key when passed through the openings 13 extends transversely of the track 22 in crossed relation to outer faces thereof and portions of the key are reduced in diameter to rotatably carry rollers 30 which bear against the outer faces of the track. It will thus be seen that, while the key will serve very effectively to hold the emergency wheel upon the shank or stub shaft 9, the rollers will turn freely and the portions of the key extending across the track may move easily along the track when the emergency wheel is shifted from its initial position eccentric to the main wheel to a position in which it is concentric to the main wheel. The intermediate portion 31 of the key is offset with respect to the portion carrying the track-engaging rollers, and from an inspection of Figures 1 and 6, it will be readily understood that, when the key is grasped by its turning handle 32 and turned to the position shown in Figure 6, a cam action will take place which will force the emergency wheel towards the inner end of the shank 9 where it will be firmly held with the inner disk 17 bearing against the outer end of the base 10 and the adjacent side edge of the tire-carrying rim 4. When it is desired to remove the emergency wheel, it is merely necessary to turn the key a partial revolution to a position in which pressure will no longer be applied to the tracks and the key may then be withdrawn from the opening 13 through which it passes. It will thus be seen that the emergency wheel may be easily and quickly secured upon the shank or stub shaft of its mounting and also easily removed. In view of the fact that the key when in the position shown in Figure 6 holds the emergency wheel in close contacting engagement with the base 10 of its mounting and the side edge of the wheel rim 4, shifting movement of the emergency wheel longitudinally of the shank will be prevented and the emergency wheel will be prevented from having wobbling movement when in use.

When the tire 19 of the main wheel is punctured and goes flat as shown in Figures 1 and 2, the hub cap 7 which normally encloses and conceals the mounting is removed and the key or pin 29 removed from the opening 13 of the shank or stub shaft 9. The emergency wheel is then applied to the mounting with the shank or stub shaft passing through the slots of the inner and outer plates 17 and 18 and through the center opening of the plate 25. During this application of the emergency wheel to the shank or stub shaft of the mounting, the plate 25 is disposed at outer ends of the slots 20 and 21 and when the key is passed through one of the openings 13 and turned to the position shown in Figure 6, the emergency wheel will be mounted in eccentric relation to the main wheel and project upwardly above the same, as shown in Figure 2. At this time the shank 9 is disposed between the free end portions of the dogs 33 which are pivoted at their inner ends by pivot pins 34 carried by the side plate 18 and at their free outer ends terminate in fingers 35 for limiting movement of the dogs towards each other by engagement with the abutment lugs 36. These dogs are yieldably held in a gripping position by springs 37 coiled about guide rods or pins 38, and outer ends of the springs have abutting engagement with side brackets 39 through which the rods or pins slidably pass. It will thus be seen that the brackets serve to slidably support the pins or rods and in addition constitute abutments holding the springs under tension so that the dogs will at all times be urged towards each other. Recesses 40 are formed in the confronting side edge portions of the dogs in opposed relation to each other to engage about the shank or stub shaft 9, as shown in Figure 5, and between these recesses and the abutment fingers 35 the dogs are formed with diagonally extending side edges 41 converging toward the recesses. These diagonally extending edge faces of the dogs constitute cam surfaces for engagement by the shank or stub shaft of the mounting, and it will be readily seen that, when the emergency wheel is applied as shown in Figures 1 and 2 with the shank or stub shaft extending through the lower end portions of the slots 20 and 21 and the main wheel then turned to gradually bring the tire 16 of the emergency wheel into engagement with the ground, the pressure exerted upon the emergency wheel will shift this wheel longitudinally of the slots and the cam action which takes place between the shank and the cam surfaces 41 will cause the dogs to be spread apart until the shank or stub shaft reaches the inner ends of the slots.

The springs will now force the dogs towards each other to the position shown in Figure 5, and the shank or stub shaft will be engaged in the recesses 40. The emergency wheel will thus be firmly secured concentric to the main wheel, and since the diameter of the emergency wheel is slightly greater than the diameter of the tire 19, the weight of the vehicle which is normally supported by the tire 19 will be carried by the emergency wheel and the punctured tire will be held out of engagement with the ground, as shown in Figure 3. The automobile may then proceed along the road without interference by the punctured tire. When it is desired to mend the punctured tire, the axle will be jacked up, the securing pin 29 withdrawn and the emergency wheel shifted longitudinally off the shank or stub shaft. The punctured tired can then be removed from the rim of the main wheel and replaced after the puncture has been mended or a new tire applied to the main wheel. The hub cap will then be replaced and the emergency wheel placed in the storage compartment of the automobile until again needed. Since the emergency wheel is quite thin, it will occupy only a small space in the storage compartment. It should be noted, however, that the emergency wheel is very strong and when applied it may be used for an indefinite length of time without danger of collapsing. Its light weight permits it to be very easily applied or removed.

Having thus described the invention, what is claimed as new is:

1. In a device of the character described, a mounting member adapted to be secured concentric to a main wheel, an emergency wheel carried by said mounting and shiftable from a position eccentric thereto to a position concentric to the mounting, said emergency wheel including inner and outer side plates, and means between the side plates for securing the emergency wheel when shifted to the adjusted position concentric to the mounting.

2. In a device of the character described, a mounting adapted to be carried by a main wheel concentric thereto and including a shank, an emergency wheel removably applied to said shank, cam means for maintaining the emergency wheel upon the shank and preventing shifting movement thereof longitudinally of the shank, the emergency wheel when applied to the shank being shiftable radially from a position eccentric to the shank to an adjusted position concentric to the shank, and means for releasably securing the emergency wheel in the adjusted position concentric to the shank.

3. A device of the character described comprising a mounting adapted to be carried by a main wheel concentric thereto, an emergency wheel, a mounting-engaging member carried by said emergency wheel for fitting about a portion of the mounting, the emergency wheel being shiftable radially of itself upon the mounting-engaging member, a pin passed transversely through said mounting and having offset portions, means on the offset portions and rotatably engaging the emergency wheel for holding the emergency wheel upon the mounting when the pin is turned to dispose its offset portions in contacting engagement with the emergency wheel, and means for releasably securing the emergency wheel in an adjusted position concentric to the mounting.

4. In a device of the character described, a mounting adapted to be carried by a main wheel concentric thereto, an emergency wheel having inner and outer side plates formed with opposed slots extending radially thereof from centers of the side plates, tracks carried by one side plate at opposite sides of the slot therein, a mounting plate slidable between said tracks longitudinally of the slots and formed with an opening to receive the mounting, and means carried by one side plate between the same for engaging the mounting and holding the emergency wheel in a set position when shifted from a position eccentric to the mounting to a position concentric to the mounting.

5. A device of the character described comprising a mounting adapted to be carried by a main wheel centrally thereof and having an outwardly extending shank, an emergency wheel having inner and outer side plates spaced from each other and formed with opposed slots extending radially of the plate from centers thereof, tracks carried by the outer plate and extending longitudinally of the slot thereof at opposite sides of the slot, a mounting plate between said tracks slidable longitudinally thereof and formed with an opening receiving said shank, the shank being passed through the slots of the side plates and through the opening in the mounting plate with its outer end portion projecting from the mounting plate, securing means carried by the protruding outer end portion of said shank for holding the emergency wheel upon the shank, and means carried by one of said plates between the same for engaging said shank and releasably securing the emergency wheel in a set position concentric to the shank and the main wheel.

6. In a device of the character described, a mounting adapted to be carried by a main wheel concentric thereto and having an outwardly extending shank, an emergency wheel having side plates spaced from each other and formed with opposed slots extending radially of the side plates from centers thereof, tracks extending along the outer face of the outer side plates at opposite sides of the slot therein, a mounting plate slidable longitudinally of the shank between the same and formed with an opening to receive said shank, end plates between said shank limiting sliding movement of the mounting plate, said shank being passed outwardly through the slots and through the opening of the mounting plate with its free end portion projecting outwardly from the mounting plate and formed with a transversely extending opening, a securing pin removably passed through the opening in the outer end portion of said shank with end portions projecting from opposite sides of the shank and offset to provide cam portions extending across said tracks, rollers carried by said cam portions and contacting with said tracks, one end portion of said pin being bent to form a handle for turning the pin in the opening of the shank and moving the cam portions and rollers into position to engage said tracks and hold the emergency wheel upon the shank firmly against the main wheel, and means carried by the emergency wheel for engaging said shank and releasably holding the emergency wheel in a set position concentric to the shank.

7. A device of the character described comprising a mounting member adapted to be carried by a main wheel concentric thereto and having an outwardly extending flat-sided shank, an emergency wheel having side plates spaced from each other and formed with opposed slots extending radially of the plates from centers thereof, a member carried by said outer side plate for engaging about said shank, said shank being passed outwardly through the slots of the side plates and through the said member and the said member being shiftable longitudinally of the slots to mount the emergency wheel for sliding adjustment from a position eccentric to the shank to a position concentric thereto, dogs pivotally mounted between the side plates with their free end portions spaced from each other for extending along opposite sides of the shank and having cam surfaces for engaging the shank, said dogs having confronting recesses for receiving the shank and securing the emergency wheel in an adjusted position concentric to the shank, springs urging said dogs toward each other, and means for limiting movement of the dogs toward each other.

NICHOLAS Z. GRASSO.